(12) United States Patent
Voicu et al.

(10) Patent No.: US 11,650,871 B2
(45) Date of Patent: May 16, 2023

(54) SYSTEM AND COMPUTER-IMPLEMENTED METHOD FOR VERIFICATION OF EXECUTION OF AN ACTIVITY

(71) Applicant: UiPath, Inc., New York, NY (US)

(72) Inventors: Cosmin Voicu, Bucharest (RO); Ion Miron, Bucharest (RO)

( * ) Notice: Subject to any disclaimer, the term of this patent is extended or adjusted under 35 U.S.C. 154(b) by 0 days.

(21) Appl. No.: 17/473,210

(22) Filed: Sep. 13, 2021

(65) Prior Publication Data

US 2023/0084546 A1 Mar. 16, 2023

(51) Int. Cl.
| | |
|---|---|
| G06F 9/451 | (2018.01) |
| G06F 11/07 | (2006.01) |
| G06F 3/0482 | (2013.01) |
| G06F 3/0484 | (2022.01) |
| G06V 10/75 | (2022.01) |

(52) U.S. Cl.
CPC ........ *G06F 11/0769* (2013.01); *G06F 3/0482* (2013.01); *G06F 3/0484* (2013.01); *G06F 9/451* (2018.02); *G06F 11/0757* (2013.01); *G06V 10/751* (2022.01)

(58) Field of Classification Search
CPC .. G06F 11/0769; G06F 3/0482; G06F 3/0484; G06F 9/451; G06F 11/0757; G06V 10/751
See application file for complete search history.

(56) References Cited

U.S. PATENT DOCUMENTS

| | | | | |
|---|---|---|---|---|
| 9,081,595 B1 * | 7/2015 | Delarue | ............... | G06F 9/44589 |
| 9,852,258 B1 * | 12/2017 | Foster | ................... | G06F 30/398 |
| 10,078,626 B1 * | 9/2018 | Voskamp | ............. | G06F 40/143 |
| 10,289,524 B2 | 5/2019 | Kaulgud et al. | | |
| 10,365,799 B2 | 7/2019 | Hosbettu et al. | | |
| 10,399,778 B1 * | 9/2019 | Shekhawat | ............ | G06Q 50/28 |
| 10,860,459 B2 | 12/2020 | Saaroni et al. | | |
| 2004/0107415 A1 * | 6/2004 | Melamed | ............ | G06F 11/3684 717/124 |

(Continued)

FOREIGN PATENT DOCUMENTS

| | | |
|---|---|---|
| CN | 109885499 A | 6/2019 |
| CN | 111679808 A | 9/2020 |

(Continued)

OTHER PUBLICATIONS

International Search Report & Written Opinion, dated Jun. 2, 2022, PCT Application No. PCT/US21/56966.

*Primary Examiner* — Tuyetlien T Tran
(74) *Attorney, Agent, or Firm* — LeonardPatel PC; Sheetal S. Patel; Michael A. Leonard, II

(57) ABSTRACT

A system and a method for verification of execution of an activity are provided. The method comprises receiving a user input indicative of enablement of the verification, and displaying, in response to the reception of the user input, a target element comprising a menu for selecting an edit action. The method further comprises receiving, in response to the selection of the edit action, a verification element, and determining a status of the activity, wherein the status of the activity comprises either of successful execution of the activity or non-successful execution of the activity. Further, the method comprises generating a verification response based on the status of the activity and the verification element.

20 Claims, 14 Drawing Sheets

(56) References Cited

U.S. PATENT DOCUMENTS

| | | | | |
|---|---|---|---|---|
| 2010/0005529 | A1* | 1/2010 | Hemade | H04L 41/0869 |
| | | | | 726/22 |
| 2011/0307860 | A1* | 12/2011 | Park | G06F 11/3688 |
| | | | | 717/145 |
| 2012/0123825 | A1* | 5/2012 | Biran | G06Q 10/0637 |
| | | | | 705/7.36 |
| 2014/0046969 | A1* | 2/2014 | Ejsing | G06F 16/2365 |
| | | | | 707/769 |
| 2015/0067697 | A1* | 3/2015 | Iizuka | G06F 9/52 |
| | | | | 718/106 |
| 2016/0275000 | A1* | 9/2016 | Sharma | G06F 11/3664 |
| 2017/0068911 | A1* | 3/2017 | Wiig | G06F 16/3331 |
| 2018/0260506 | A1* | 9/2018 | Wood | G06F 30/3308 |
| 2019/0129824 | A1 | 5/2019 | Radhakrishnan et al. | |
| 2019/0235713 | A1* | 8/2019 | Borenstein | G06F 30/3323 |
| 2020/0097753 | A1* | 3/2020 | Ash | G06V 30/40 |
| 2020/0389319 | A1* | 12/2020 | Wise | H04L 9/3247 |
| 2021/0023709 | A1 | 1/2021 | Geffen et al. | |
| 2021/0191843 | A1 | 6/2021 | Stocker et al. | |
| 2021/0352116 | A1* | 11/2021 | Merten | H04L 65/1069 |
| 2021/0409551 | A1* | 12/2021 | Igarashi | H04N 1/00801 |
| 2022/0092607 | A1* | 3/2022 | Jeske | G06F 9/45558 |
| 2022/0269790 | A1* | 8/2022 | Rajana | G06F 21/577 |

FOREIGN PATENT DOCUMENTS

| | | |
|---|---|---|
| GB | 2524737 A | 10/2015 |
| JP | 2020091805 A | 6/2020 |
| JP | 2020113034 A | 7/2020 |

* cited by examiner

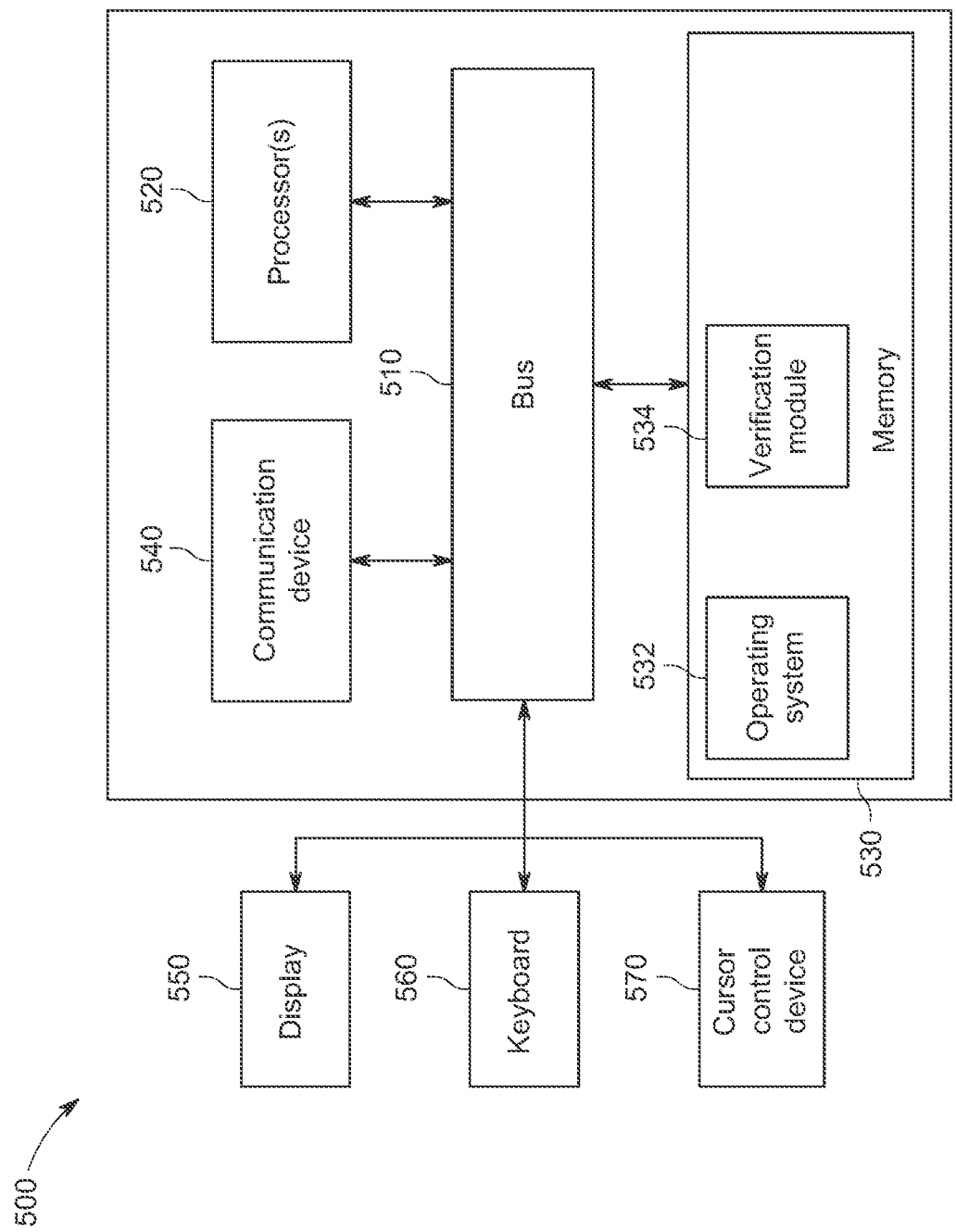

US 11,650,871 B2

SYSTEM AND COMPUTER-IMPLEMENTED METHOD FOR VERIFICATION OF EXECUTION OF AN ACTIVITY

FIELD

The present invention generally relates to robotic process automation (RPA), and more specifically, to verification of execution of an activity using RPA.

BACKGROUND

RPA has been used to facilitate the proliferation of software automation due to its execution of relatively simple, repeatable tasks that exist in large numbers within an enterprise. RPA generally allows automation of activities that were earlier done using manual user input to a computing system and are now being increasingly performed by software robots using RPA tools. Currently, RPA tools are available which may help a software developer to design, execute, deploy, and test the activities. The activities may include, for example, a click activity, a type activity, a hover activity, and the like. However, the activities may not be performed successfully due to several reasons. For example, input methods for the activities may be a black hole or an RPA tool state may not be ready. Therefore, there is a need for a system and a method to verify if the activity is executed successfully or not.

SUMMARY

Certain embodiments of the present invention provide better and easy solutions to the problems and needs in the art that have not yet been fully identified, appreciated, or solved by current RPA technologies. For example, some embodiments of the present invention pertain to verification of execution of an activity.

In an embodiment, a system for verification of execution of the activity is provided. The system comprises a memory configured to store one or more computer-executable instructions, and at least one processor configured to execute the one or more computer-executable instructions to receive a user input indicative of enablement of the verification, and display, in response to the reception of the user input, a target element comprising a menu for selecting an edit action. The at least one processor is further configured to execute the one or more instructions to receive, in response to the selection of the edit action, a verification element, and determine a status of the activity. The status of the activity comprises either of successful execution of the activity or non-successful execution of the activity. The at least one processor is further configured to execute the one or more instructions to generate a verification response based on the status of the activity and the verification element.

In an embodiment, a computer-implemented method is provided. The computer-implemented method employs at least one hardware processor for executing a series of operations, wherein the series of operations are used for verification of execution of an activity. The series of operations include receiving a user input indicative of enablement of the verification, and displaying, in response to the reception of the user input, a target element comprising a menu for selecting an edit action. The series of operations further include receiving, in response to the selection of the edit action, a verification element, and determining a status of the activity, wherein the status of the activity comprises either of successful execution of the activity or non-successful execution of the activity. The series of operations further include generating a verification response based on the status of the activity and the verification element.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is an architectural diagram illustrating a computing system configured for verification of successful execution of an activity, according to an embodiment of the present invention.

DETAILED DESCRIPTION OF THE EMBODIMENTS

Figure 1:
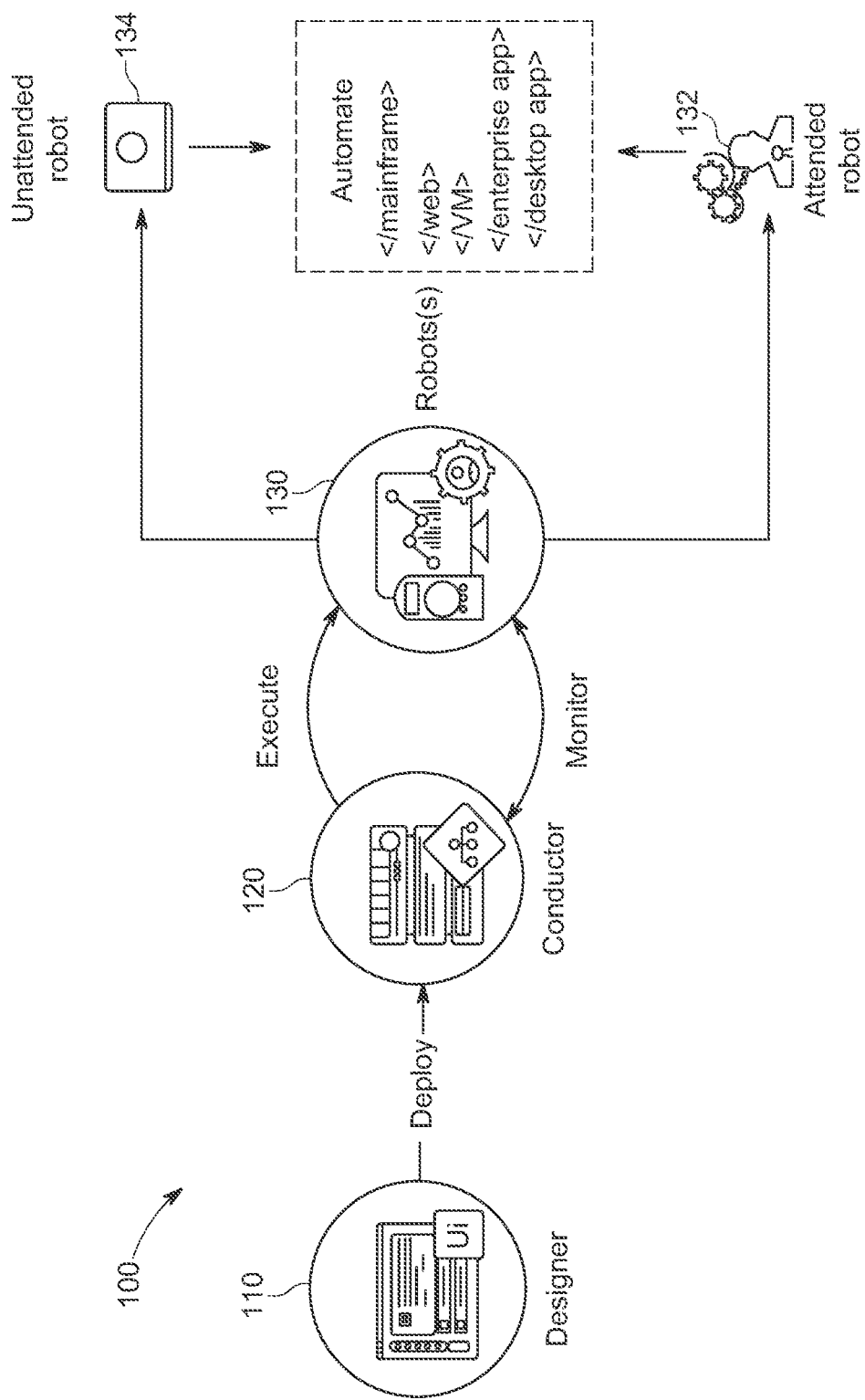
FIG. 1 is an architectural diagram illustrating an RPA system, according to an embodiment of the present invention.

Some embodiments pertain to a system (hereinafter referred to as a "computing system") configured to verify successful execution of an activity. The activity may be a click activity, a type activity, or a hover activity. The system may display an activity configuration interface, such as an activity tab that may correspond to a click/type activity. The activity tab includes a menu, such as a hamburger type menu. The hamburger type menu includes multiple options related to verification of the activity. For example, the user may press on the hamburger menu to display a list of elements. The list of elements may include an option 'add verification'. From this, the user may select the add verification option to enable the verification of successful execution the activity. In response to the selection of the add verification option, the system displays a target element. The target element includes a second menu, which may be a second hamburger menu. The user may select an option from the second hamburger menu of the target element to display a list of elements including one or more options such as 'indicate target' and 'edit target'. The user may select any option from the second hamburger menu. For example, when the user selects the edit target option to input a verification element to the user is further enabled to specify if the verification element should appear or disappear upon the successful execution of the activity. The appearance and disappearance of the verification element may be referred to as 'verification action'. The verification element may appear or disappear, as specified, upon the successful execution of the activity.

In one example, the user selects the edit target option and input the verification element as 'XYZ'. Further, the user may select the indicate target option and specify the verification action as 'appear'. Thus, the selection of all these options translates to specifying that upon successful execution of the activity associated with this target element, the text "XYZ" should appear. At runtime or while testing of an application or a workflow that implements the activity, the system may determine a status of the activity. In other words, the system determines if the activity is executed successfully or not. If the activity is executed successfully, then the system displays the verification element—'XYZ' to indicate to the user that the activity is executed successfully. If the verification element—'XYZ' does not appear, then it is inferred that the activity is not executed successfully. In such a manner, the successful execution of the activity is verified.

In addition, some embodiments incorporate use of computationally efficient technologies like robotic process automation (RPA) to provide high degree of computational efficiency, by providing improved execution time and reduced storage requirements and at the same time, less complexity at user device level. This is because the "system" may be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the embodiments in any way but is intended to provide one example of the many embodiments. Indeed, some embodiments may be implemented in localized and distributed forms consistent with computing technology, including cloud computing systems. These and other architectural configurations are discussed in the following description, without limiting the scope of the embodiments of the present invention.

FIG. 1 is an architectural diagram illustrating an RPA system 100, according to an embodiment of the present invention. RPA system 100 includes a designer 110 that allows a developer or a user to design and implement workflows. Designer 110 provides a solution for application integration, as well as automating third-party applications, administrative Information Technology (IT) tasks, and business IT processes. Designer 110 further facilitates development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity includes an action, such as clicking a button, reading a file, writing to a log panel, typing into a text box, hovering over a GUI element, etc. In some embodiments, workflows can be nested or embedded.

Some types of workflows include, but are not limited to, sequences, flowcharts, Finite State Machines (FSMs), and/or global exception handlers. Sequences are particularly suitable for linear processes, enabling flow from one activity to another without cluttering a workflow. Flowcharts are particularly suitable to more complex business logic, enabling integration of decisions and connection of activities in a more diverse manner through multiple branching logic operators. FSMs are particularly suitable for large workflows. FSMs use a finite number of states in their execution, which can be triggered by a condition (i.e., transition) or an activity. Global exception handlers are particularly suitable for determining workflow behavior when encountering an execution error and for debugging processes.

Once a workflow is developed in designer 110, execution of business processes is orchestrated by a conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 acts as an integration point with third-party solutions and applications. In an embodiment, conductor 120 is integrated with a web-based user interface.

Conductor 120 manages a fleet of robots 130, connecting and executing robots 130 from a centralized point. Types of robots 130 that are managed include, but are not limited to, attended robots 132, unattended robots 134, development robots (similar to the unattended robots 134, but used for development and testing purposes), and nonproduction robots (similar to the attended robots 132, but used for development and testing purposes). The attended robots 132 are triggered by user events and operate alongside a human on the same computing system. The attended robots 132 are used with conductor 120 for a centralized process deployment and logging medium. Attended robots 132 help a human user accomplish various tasks and are triggered by the user events. In some embodiments, processes are not started from conductor 120 on this type of robot and/or they do not run under a locked screen. In certain embodiments, the attended robots 132 are started from a robot tray or from a command prompt. The attended robots 132 run under human supervision in some embodiments.

The unattended robots 134 run unattended in virtual environments and automate many processes. The unattended robots 134 are responsible for remote execution, monitoring, scheduling, and providing support for work queues. Debugging for all robot types is run in designer 110 in some embodiments. Both the attended robots 132 and unattended robots 134 automate various systems and applications including, but not limited to, mainframes, web applications, Virtual machines (VMs), enterprise applications (e.g., those produced by SAP®, SalesForce®, Oracle®, etc.), and computing system applications (e.g., desktop and laptop applications, mobile device applications, wearable computer applications, etc.).

Conductor 120 has various capabilities including, but not limited to, provisioning, deployment, configuration, queueing, monitoring, logging, and/or providing interconnectivity.

Provisioning includes creating and maintenance of connections between robots 130 and conductor 120 (e.g., a web application). Deployment includes assuring the correct delivery of package versions to the assigned robots 130 for execution. Configuration includes maintenance and delivery of robot environments and process configurations. Queueing includes providing management of queues and queue items. Monitoring includes keeping track of robot identification data and maintaining user permissions. Logging includes storing and indexing logs to a database (e.g., an SQL database) and/or another storage mechanism (e.g., ElasticSearch®, which provides an ability to store and quickly query large datasets). Conductor 120 provides interconnectivity by acting as the centralized point of communication for the third-party solutions and/or applications.

Robots 130 can be execution agents that run workflows built in designer 110. One commercial example of some embodiments of the robot(s) 130 is UiPath Robots™. In some embodiments, robots 130 install the Microsoft Windows® Service Control Manager (SCM)—managed service by default. As a result, robots 130 can open interactive Windows® sessions under the local system account and have rights of a Windows® service.

In some embodiments, robots 130 are installed in a user mode. For such robots 130, this means they have the same rights as the user under which a given robot 130 has been installed. This feature is also available for High Density (HD) robots, which ensure full utilization of each machine at its maximum potential. In some embodiments, any type of robots 130 can be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between the conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. The user mode robot services can be trusted with and manage the credentials for robots 130. A Windows® application is automatically launched if the SCM-managed robot service is not installed.

Executors run given jobs under a Windows® session (i.e., they may execute workflows). The executors are aware of per-monitor dots per inch (DPI) settings. Agents could be Windows® Presentation Foundation (WPF) applications that display the available jobs in the system tray window. The agents could be a client of the service. The agents request to start or stop jobs and change settings. The command line is a client of the service. The command line is a console application that requests to start jobs and waits for their output.

Having components of robots 130 split as explained above helps developers, support users, and computing systems more easily run, identify, and track what each component is executing. Special behaviors can be configured per component this way, such as setting up different firewall rules for the executor and the service. The executor is always aware of the DPI settings per monitor in some embodiments. As a result, the workflows can be executed at any DPI, regardless of the configuration of the computing system on which they were created. Projects from designer 110 can also be independent of a browser zoom level in some embodiments. For applications that are DPI-unaware or intentionally marked as unaware, DPI is disabled in some embodiments.

Figure 2:
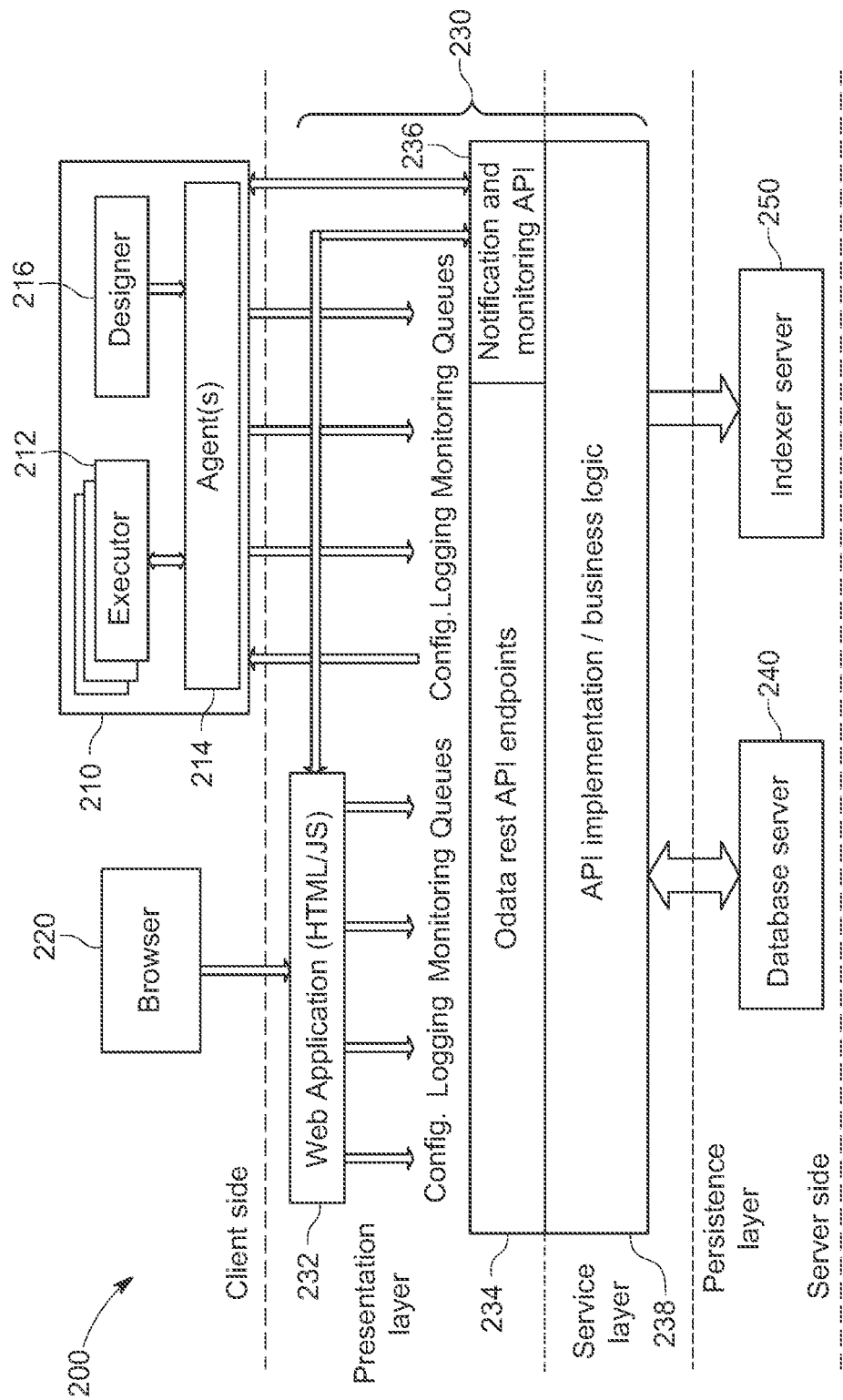
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may not be a part of, RPA system 100 of FIG. 1. It should be noted that a client side, a server side, or both, may include any desired number of the computing systems without deviating from the scope of the invention. On the client side, a robot application 210 includes executors 212, an agent 214, and a designer 216 (for instance, the designer 110). However, in some embodiments, designer 216 is not running on robot application 210. Executors 212 are running processes. Several business projects (i.e., executors 212) run simultaneously, as shown in FIG. 2. Agent 214 (e.g., the Windows® service) is the single point of contact for all executors 212 in this embodiment. All messages in this embodiment are logged into a conductor 230, which processes them further via a database server 240, an indexer server 250, or both. As discussed above with respect to FIG. 1, executors 212 are robot components.

In some embodiments, a robot represents an association between a machine name and a username. The robot manages multiple executors at the same time. On computing systems that support multiple interactive sessions running simultaneously (e.g., Windows® Server 2012), there multiple robots are running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 opens a WebSocket channel that is later used by conductor 230 to send commands to the robot (e.g., start, stop, etc.).

On the server side, a presentation layer (a web application 232, an Open Data Protocol (OData) Representative State Transfer (REST) Application Programming Interface (API) endpoint 234, and a notification and monitoring API 236), a service layer (an API implementation/business logic 238), and a persistence layer (the database server 240 and the indexer server 250) are included. Conductor 230 may include web application 232, the OData REST API endpoints 234, the notification and monitoring API 236, and the API implementation/business logic 238. In some embodiments, most actions that a user performs in an interface of conductor 230 (e.g., via a browser 220) are performed by calling various APIs. Such actions include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user creates robot groups, assign packages to the robots, analyze logs per robot and/or per process, start and stop robots, etc.

In addition to web application 232, conductor 230 also includes service layer that exposes the OData REST API endpoints 234. However, other endpoints may be included without deviating from the scope of the invention. The REST API is consumed by both web application 232 and agent 214. The agent 214 is the supervisor of the one or more robots on the client computer in this embodiment.

The REST API in this embodiment covers configuration, logging, monitoring, and queueing functionality. The configuration endpoints are used to define and configure application users, permissions, robots, assets, releases, and environments in some embodiments. Logging REST endpoints are used to log different information, such as errors, explicit messages sent by the robots, and other environment-specific information, for instance. Deployment REST endpoints are used by the robots to query the package version that should be executed if the start job command is used in conductor 230. Queueing REST endpoints are responsible for queues and queue item management, such as adding data to a queue, obtaining a transaction from the queue, setting the status of a transaction, etc.

Monitoring REST endpoints monitor web application 232 and agent 214. The notification and monitoring API 236 could be REST endpoints that are used for registering agent 214, delivering configuration settings to agent 214, and for sending/receiving notifications from the server and agent 214. The notification and monitoring API 236 also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 manages queues and queue items. In some embodiments, database server 240 stores messages logged by the robots (in addition to or in lieu of indexer server 250).

Indexer server 250, which is optional in some embodiments, stores and indexes the information logged by the robots. In certain embodiments, indexer server 250 could be disabled through the configuration settings. In some embodiments, indexer server 250 uses ElasticSearch®, which is an open-source project full-text search engine. The messages logged by robots (e.g., using activities like log message or write line) are sent through the logging REST endpoint(s) to indexer server 250, where they are indexed for future utilization.

Figure 3:
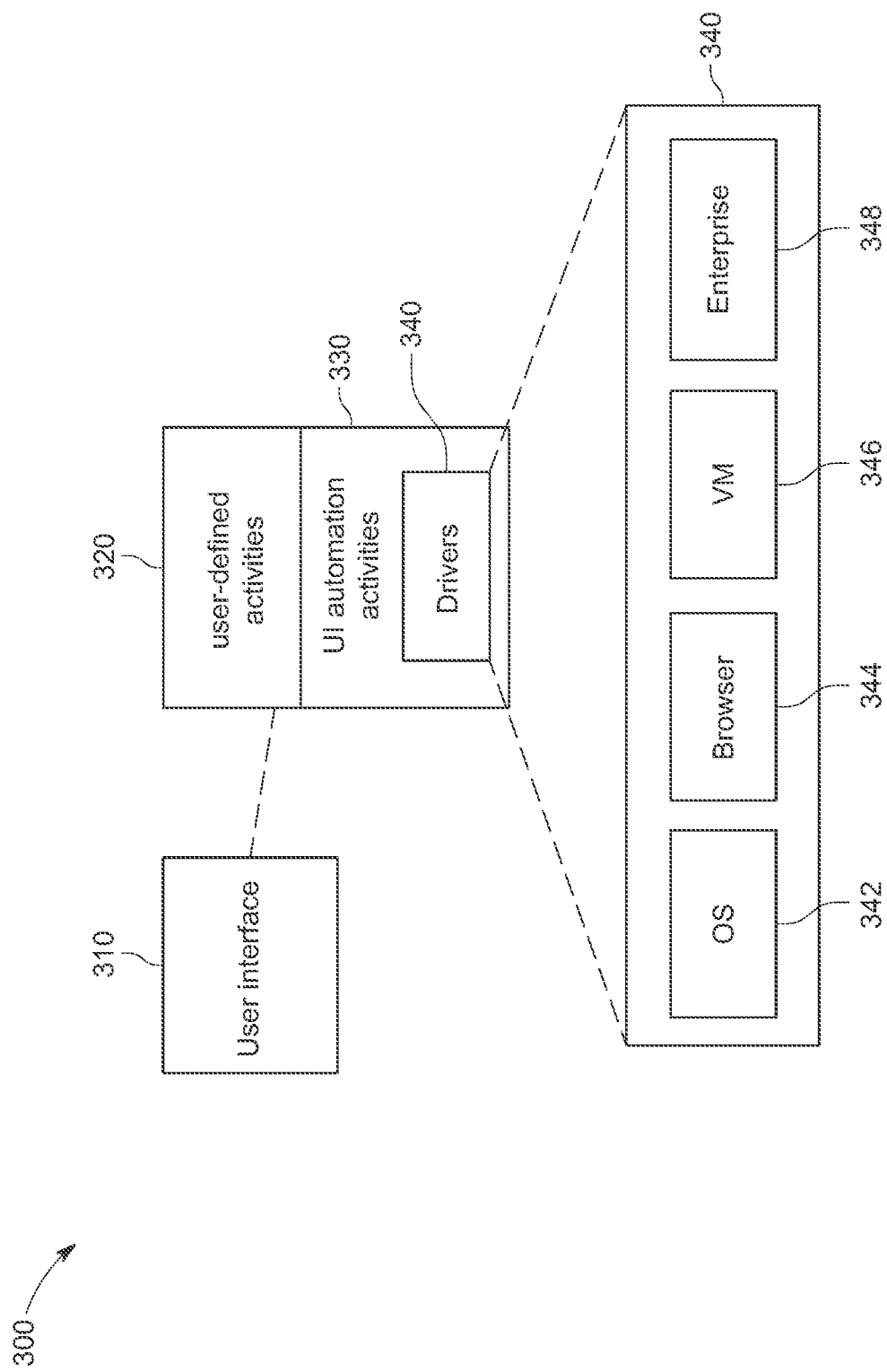
FIG. 3 is an architectural diagram illustrating the relationship between a designer, activities, and drivers, according to an embodiment of the present invention.
Figure 6A:
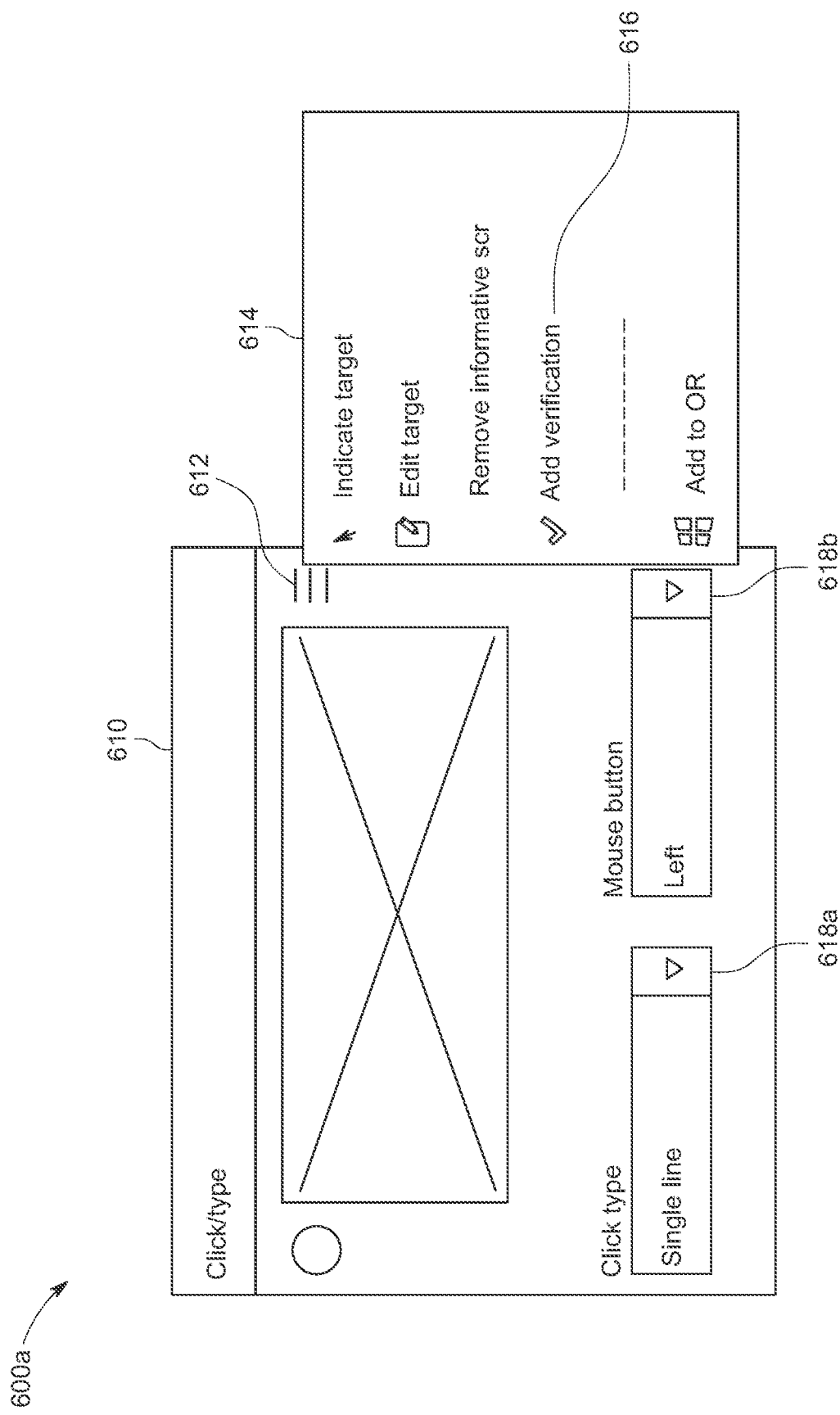
FIGS. 6A-6C show graphical user interfaces (GUIs) associated with operations for verification of execution of an activity, according to an embodiment of the present invention.

FIG. 3 is an architectural diagram illustrating a relationship 300 between a user interface 310, user-defined activities 320, User Interface (UI) automation activities 330, and drivers 340, according to an embodiment of the present invention. Per the above, user interface 310 comprises an interface between an end user and an RPA application. When the end user is developer, trying to generate or create RPA applications or workflows for automation, user interface 310 may include an application design module or environment, such as UIPath Designer™. The RPA application or workflow may be related to automation of UI access operations, as defined by various types of UI automation activities 330. UI automation activities 330 may be configurable by the user, such as by including an activity configuration interface or activity configurations options within user interface 310. Such activity configuration options may include an activity tab for configuring an activity of interest. For example, one activity may be a click activity. Other activities may include such as type activity, hover activity and the like. The activity configuration options for such activities may comprise options for verifying successful execution of the activity of interest. In some embodiments, the options for verifying the activity of interest are provided by including a hamburger menu in user interface 310. The user may press on the hamburger menu to display a list of elements. The list of elements may include an option 'add verification'. The user may select the add verification option to enable the verification of successful execution the activity of interest. A user interface embodied in this manner is illustrated in FIG. 6A and will be described in detail with description of FIG. 6A.

In some embodiments, the workflows include user-defined activities 320 and UI automation activities 330. Some embodiments are able to identify non-textual visual components in an image associated with the workflows, such as the label data, which is an image of the artwork label, using computer vision (CV) activities. Some CV activities pertaining to such components may include, but are not limited to, extracting of text from segmented label data using optical character recognition (OCR), fuzzy text matching, cropping of segmented label data using ML, comparison of extracted text in label data with ground truth data and the like. In some embodiments, there may be hundreds or even thousands of activities that may be implemented in user defined activities 320 component. However, any number and/or type of activities may be available without deviating from the scope of the invention.

UI automation activities 330 are a subset of special, lower-level activities that are written in lower-level code (e.g., CV activities) and facilitate interactions with the screen. In some embodiments, UI automation activities 330 include the type activity (also referred to as "type into" activity), the click activity, or the hover activity as discussed above. UI automation activities 330 facilitate these activities via drivers 340 that allow the robot to interact with the desired software. For instance, drivers 340 include Operating System (OS) drivers 342, browser drivers 344, VM drivers 346, enterprise application drivers 348, etc.

Drivers 340 are configured to interact with OS drivers 342 at a low level looking for hooks, monitoring for keys, etc. They may facilitate integration with Chrome®, IE®, Citrix®, SAP®, etc. For instance, the "click" activity performs the same role in these different applications via drivers 340. Drivers 340 may enable execution of an RPA application in an RPA system. Browser drivers 344 include a web-based user interface for a user or developer to interact.

Figure 4:
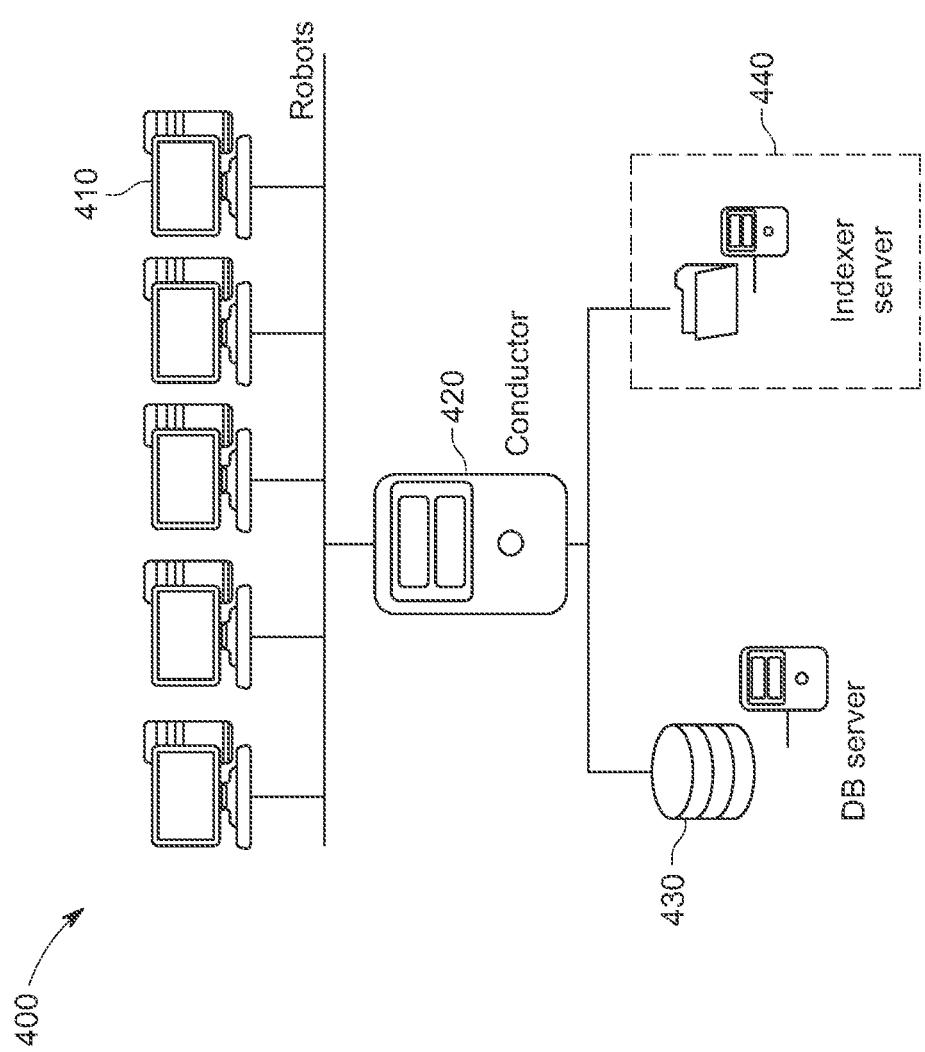
FIG. 4 is an architectural diagram illustrating another RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 (for instance, running robots). In some embodiments, multiple client computing systems 410 are configured to compare the multiple RPA packages and RPA workflows. Multiple client computing systems 410 are further configured to communicate with a conductor computing system 420 via a web application running thereon. Conductor computing system 420, in turn, is configured to communicate with a database server 430 (for instance, the database server 240) and an optional indexer server 440 (for instance, the optional indexer server 250).

With respect to the FIGS. 1 and 3, it should be noted that while the web application is used in these embodiments, any suitable client/server software may be used without deviating from the scope of the invention. For instance, the conductor may run a server-side application that communicates with non-web-based client software applications on the client computing systems. The server may be implemented in localized and distributed forms consistent with computing technology, including cloud computing systems.

FIG. 5 is an architectural diagram illustrating a computing system 500 configured to verify successful execution of an activity, according to an embodiment of the present invention. In some embodiments, computing system 500 may be one or more of the computing systems depicted and/or described herein. Computing system 500 includes a bus 510 or other communication mechanism for communicating information, and processor(s) 520 coupled to bus 510 for processing information. Processor(s) 520 could be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 520 may also have multiple processing cores, and at least some of the cores may be configured to perform specific functions. Multi-parallel processing is used in some embodiments. In certain embodiments, at least one of the processor(s) 520 can be a neuromorphic circuit that includes processing elements that mimic biological neurons. In some embodiments, neuromorphic circuits do not require the typical components of a Von Neumann computing architecture.

Computing system 500 further includes a memory 530 for storing information and instructions to be executed by the processor(s) 520. Memory 530 may be comprised of any combination of Random-Access Memory (RAM), Read Only Memory (ROM), flash memory, cache, static storage such as a magnetic or optical disk, or any other types of non-transitory computer-readable media or combinations thereof. The non-transitory computer-readable media may be any available non-transitory media that may be accessed by processor(s) 520 and may include volatile media, non-volatile media, or both. The media may also be removable, non-removable, or both.

Additionally, computing system 500 includes a communication device 540, such as a transceiver, to provide access to a communications network via a wireless and/or wired connection. In some embodiments, communication device 540 is configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, the communication device 540 includes one or more antennas that are singular, arrayed, phased, switched, beamforming, beam steering, a combination thereof, and or any other antenna configuration without deviating from the scope of the invention.

Processor(s) 520 are further coupled via bus 510 to a display 550, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. The display 550 is configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 560 and a cursor control device 570, such as a computer mouse, a touchpad, etc., are further coupled to bus 510 to enable a user to interface with computing system. However, in certain embodiments, a physical keyboard and mouse are not present, and the user interacts with the device solely through display 550 and/or a touchpad (not shown). Any type and combination of input devices may be used as a matter of design choice. In certain embodiments, no physical input device and/or display is present. For instance, the user interacts with computing system 500 remotely via another computing system in communication therewith, or the computing system 500 may operate autonomously.

Memory 530 stores software modules that provide functionality when executed by processor(s) 520. The modules include an operating system 532 for computing system 500. The modules further include a verification module 534 configured to perform all, or part of the processes described herein or derivatives thereof for verifying successful execution of the activity.

One skilled in the art will appreciate that a "system", such as the computing system 500, could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to emphasize their implementation independence more particularly. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Figure 6B:
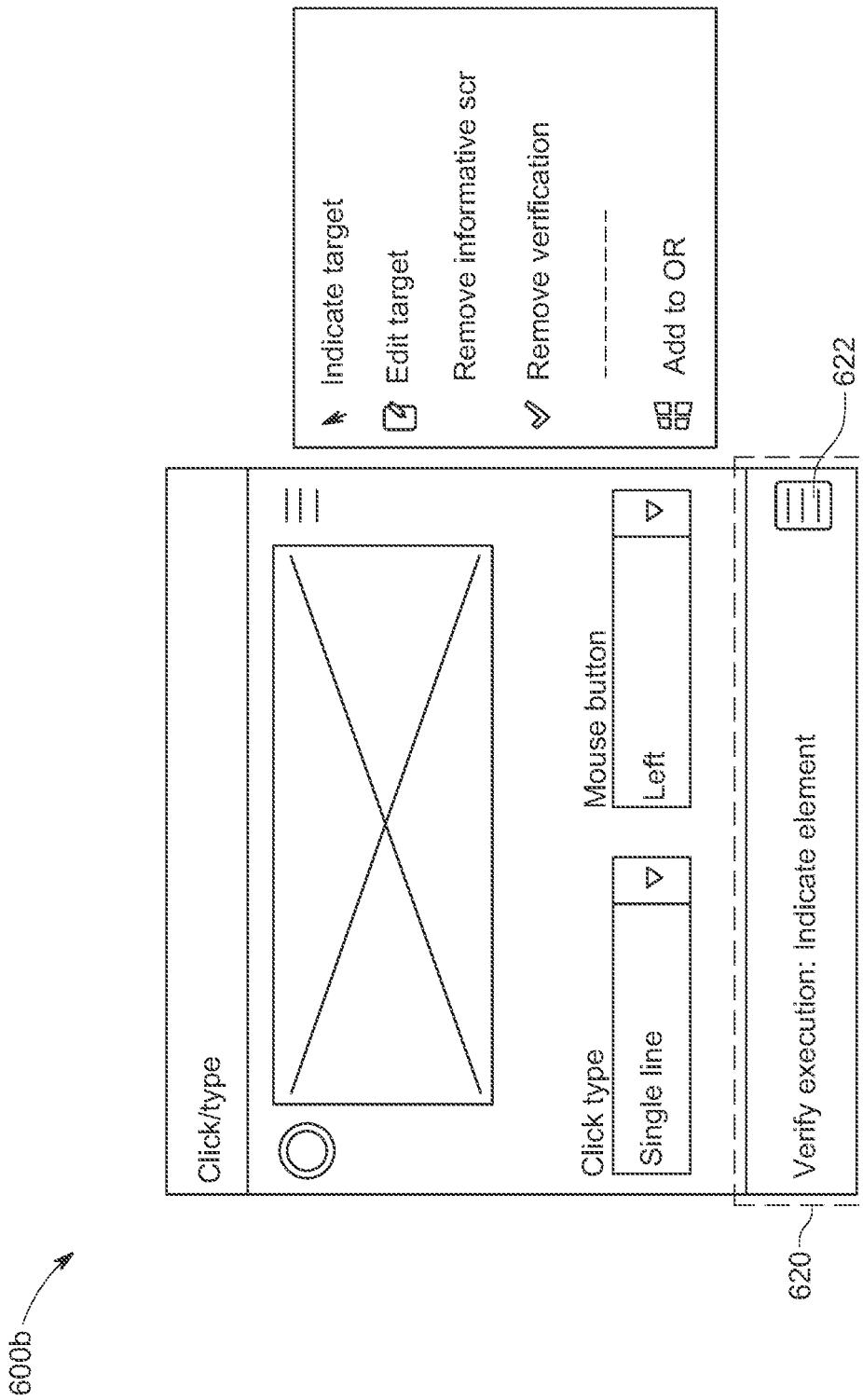
Figure 6C:
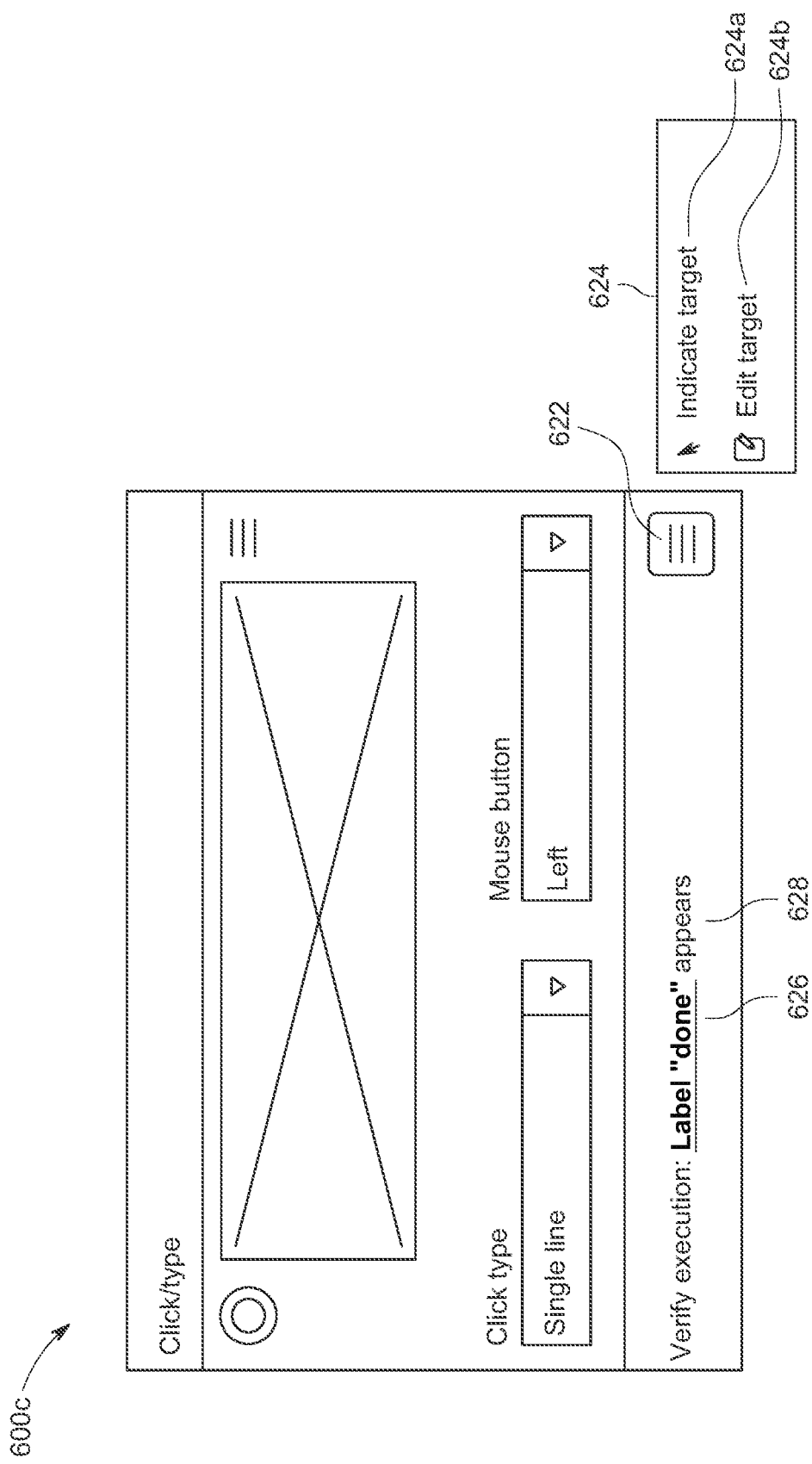

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. FIGS. 6A-6C show GUIs for verification of successful execution of the activity, according to an embodiment of the present invention.

FIG. 6A is a graphical user interface (GUI) 600*a* illustrating an activity configuration interface (e.g., activity tab 610), according to an embodiment of the present invention.

In an embodiment, tab 610 corresponds to any type of activity that is implemented in an application. Activities may include a click/a type activity. The user may provide specifications of one or more options for configuring the activity, such as one of the click/type activity in activity tab 610. In one embodiment, the user specifies a click type and a mouse button type using options 'click type' 618*a* and 'mouse button' 618*b*, respectively. For instance, the user selects click type 618*a* option and specifies the click type as single line. Similarly, the user may select mouse button 618*b* option and specify the mouse button type as left. Any of options 618*a* or 618*b* may be used as part of configuration of the click/type activity illustrated in activity tab 610.

Additionally, activity tab 610 includes a hamburger menu 612. The user may press on hamburger menu 612 to display a list of elements 614. The list of elements 614 may include an option 'add verification' 616. The user may select the 'add verification' 616 option enabling a feature for a corresponding RPA application or workflow. This RPA or workflow can perform verification of successful execution of the activity. Thus, selection of the 'add verification' 616 option corresponds to the user input indicative of enablement of the verification (of the activity). In response to the selection of the 'add verification' 616 option, processor 520 displays a target element, as illustrated in FIG. 6B.

FIG. 6B shows a GUI 600*b* including a target element 620, according to an embodiment of the present invention. Target element 620 includes a menu 622. Menu 622 is the second hamburger menu (apart from the first hamburger menu 612) which is provided as part of providing verification functionality for the activity. The user may press on menu 622 to display a list of elements described below with reference to FIG. 6C.

FIG. 6C shows a GUI 600*c* including a list of elements 624 associated with second hamburger menu 622, according to an embodiment of the present invention. The list of elements 624 is displayed in response to the selection of menu 622 by the user. The list of elements 624 corresponds to one or more actions that need to be performed for verification of the activity. The one or more actions are listed as one or more options in menu 622. Menu 622 includes one or more options such as 'indicate target' 624*a* and 'edit target' 624*b*. The user may select edit target 624*b* option to input a verification element. The user may select indicate target 624*a* option to specify if the verification element should appear or disappear upon the successful execution of the activity. The appearance and disappearance of the verification element may be referred to as 'verification action'. The verification element may appear or disappear, as specified, upon the successful execution of the activity.

For instance, the user may select the option to edit target 624*b* from menu 622, and further input the verification element 626 as Label 'Done'. Further, the user may select indicate target 624*a* option from menu 622 and specify the verification action 628 as 'appears'. In response to receiving these user inputs associated with enablement of verification for an activity and further specification of verification element and verification action, processor 502 is configured to determine a status of the activity. The status of the activity may be determined at runtime, or while testing a mock application, or while testing or development of the actual application. The application may correspond to an RPA workflow, designed using system 500.

In some embodiments, activity verification is performed at runtime of the activity, and at that time processor 502 determines if the activity is executed successfully or not. If the activity is executed successfully, then processor 502 displays verification element 626—Label 'Done' to indicate to the user that the activity is executed successfully. In addition, in some embodiments, the specified verification action 628, i.e., appears in this case, may be displayed near verification element 626—Label 'Done', for transparency. If verification element 626—Label 'Done' does not appear, then it is inferred that the activity is not executed successfully. In such a manner, the successful execution of the activity is verified.

Additionally, in some embodiments, an activity timeout property and a verification timeout property may be provided.

Figure 7:
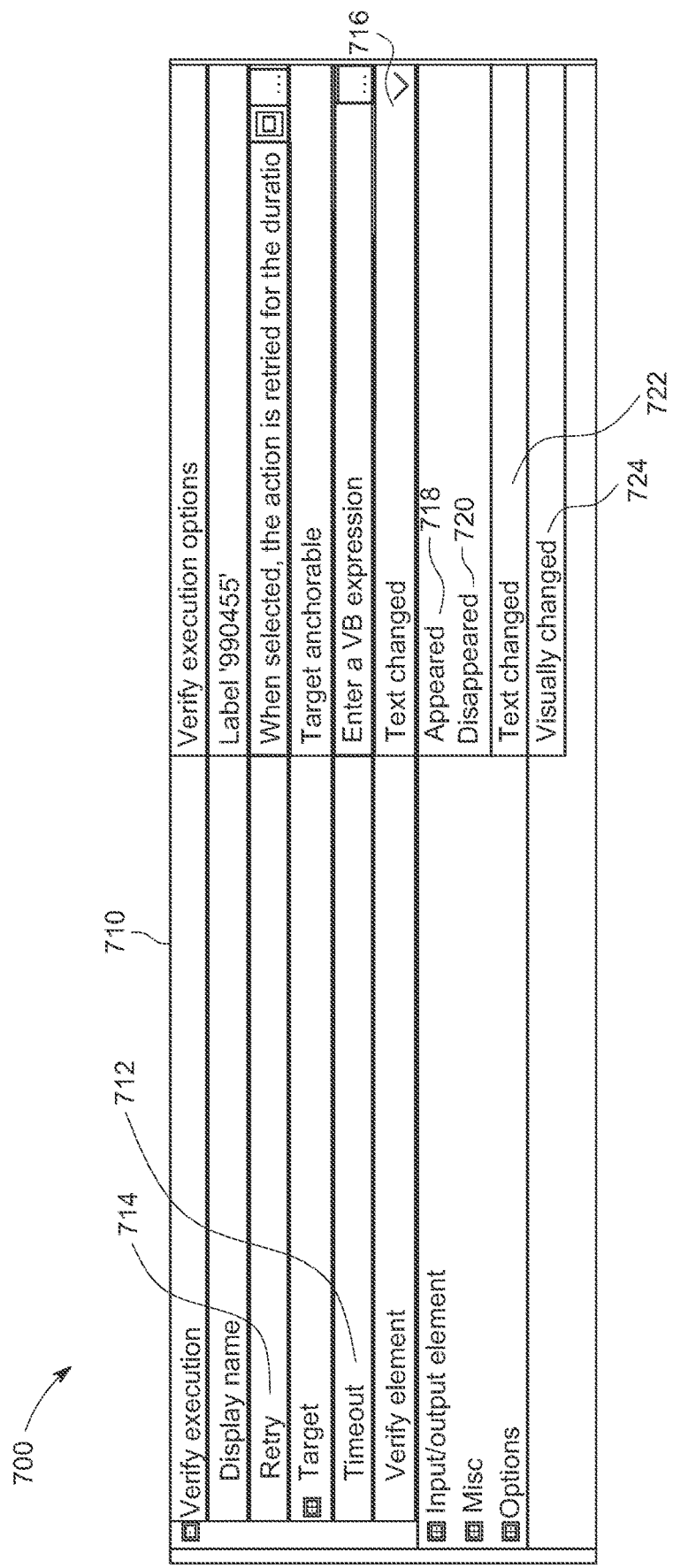
FIG. 7 shows another GUI illustrating a verification settings interface, according to an embodiment of the present invention.

FIG. 7 shows a GUI 700 illustrating a verification settings interface (e.g., a verification options tab 710), including the activity timeout property and other verify options, according to an embodiment of the present invention.

Verification options tab 710 includes a timeout 712 option. The user may select timeout 712 option to set an activity timeout duration for the activity. For example, the user may select timeout 712 option and set the activity timeout duration as ten seconds. Likewise, the user may select a retry option 714 to indicate whether or not the activity will re-execute if the verification fails. Further, the user may be able to select a verification timeout (not shown) option to set a verification timeout duration. For example, the user may select the verification timeout option and set the verification timeout duration as five seconds.

In some embodiments, processor 502 continuously determines the status of the activity, i.e., if the activity is executed successfully or not, for a duration corresponding to the activity timeout duration. If the activity is executed successfully, then processor 502 waits for the verification element to appear/disappear for a duration corresponding to the verification timeout duration. For instance, the activity timeout duration is 10 seconds, and the verification timeout duration is 5 seconds. If the activity is determined to be executed successfully within 5 seconds, then a verification response is generated in the form of appearance or disappearance a corresponding verification element that indicates successful execution of the activity. However, if the activity does not execute successfully within 5 seconds, that is to say, the verification element did not appear or disappear in the timeout of the verification, then the activity is re-executed. This is done when retry option 714 is enabled for the activity from the verification options tab 710. Further, the re-execution is tried for another 5 seconds until the activity timeout duration (e.g., 10 seconds) is reached. Thus, re-execution of an activity can be tried for as many verification durations that are within (i.e., less than or equal to) the total activity timeout duration. In the example disclosed herein, re-execution of the unsuccessful activity can be performed for 2 verification timeout durations, because total duration of two verification timeout durations is 2*5 seconds=10 seconds, which is equal to the activity timeout duration of 10 seconds. If after two tries and elapsing of the activity timeout duration of 10 seconds, the activity is still not executed successfully, then a verification response in the form of an error notification is generated to indicate un-successful execution of the activity. For example, the error notification may include a message saying, "Activity Failed".

In an embodiment, processor 502 displays an error notification, such as the error notification may mention—"The element was found but the verification failed because the action did not have the expected outcome."

Additionally, or alternatively, in some embodiments, retry 714 option is enabled or disabled to specify preference for re-execution of the activity in case of unsuccessful execution. When retry 714 option is enabled, then processor 502 is configured to re-execute the activity in case the verification element does not appear/disappear within the verification timeout duration. In some embodiments, processor 502 retries the activity for a number of verification timeout durations until the activity timeout duration is reached as discussed above. Also, in case of successful execution of activity also, processor 502 may wait for verification timeout duration to end, before generating the verification response. For example, the activity timeout duration is 20 seconds, and the verification timeout duration is 4 seconds. If the activity is determined to be executed successfully at T=9 s, processor 502 waits for verification element to appear/disappear for 4 seconds, i.e., till T=12 sec. If the verification element does not appear/disappear, then processor 502 retries the activity and waits for the verification element to appear/disappear for further 4 seconds, i.e., till T=16 sec. Further, if the verification element does not appear/disappear, then processor 502 further retries the activity and waits for the verification element to appear/disappear for further 4 seconds, i.e., till T=20 sec. To that end, processor 502 retries the verification for three times until the activity timeout duration is reached, i.e., 20 sec.

If retry 714 option is disabled, then processor 502 is configured to throw an exception at runtime, and to display the error notification in case the verification element does not appear/disappear.

In some alternate embodiments, verification options tab 710 includes a verify element dropdown 716. The verify element dropdown 716 comprises multiple options such as appeared 718, disappeared 720, text changed 722, and image changed 724. The user may select appeared 718 to specify that the verification element should appear upon the successful execution of the activity. The user may select disappeared 720 to specify that the verification element should disappear upon the successful execution of the activity. Further, in an embodiment, the user may enable text changed 722 option to verify if an indicated string is changed after the execution of the activity. After text changed option 722 is enabled, the user can input a string (e.g., text) by selecting edit target 624b option. In an embodiment, processor 502 verifies when the string is changed between before and after the execution of the activity, using a non-fuzzy algorithm.

Furthermore, the user may enable image changed 724 option to verify when an image is changed after the execution of the activity. After image changed option 724 is enabled, the user can input an image by selecting edit target 624b option. In one embodiment, processor 502 verifies when the image is changed after the execution of the activity by comparing the image before the execution of the activity and the image after the execution of the activity, using a findImage function. The image may correspond to such as a screenshot of a web page, a section of a GUI, a button, a portion of a form, and the like.

In some embodiments, specifically for 'type into' activities, an 'add auto verification' option is provided instead of add verification 616.

Figure 8A:
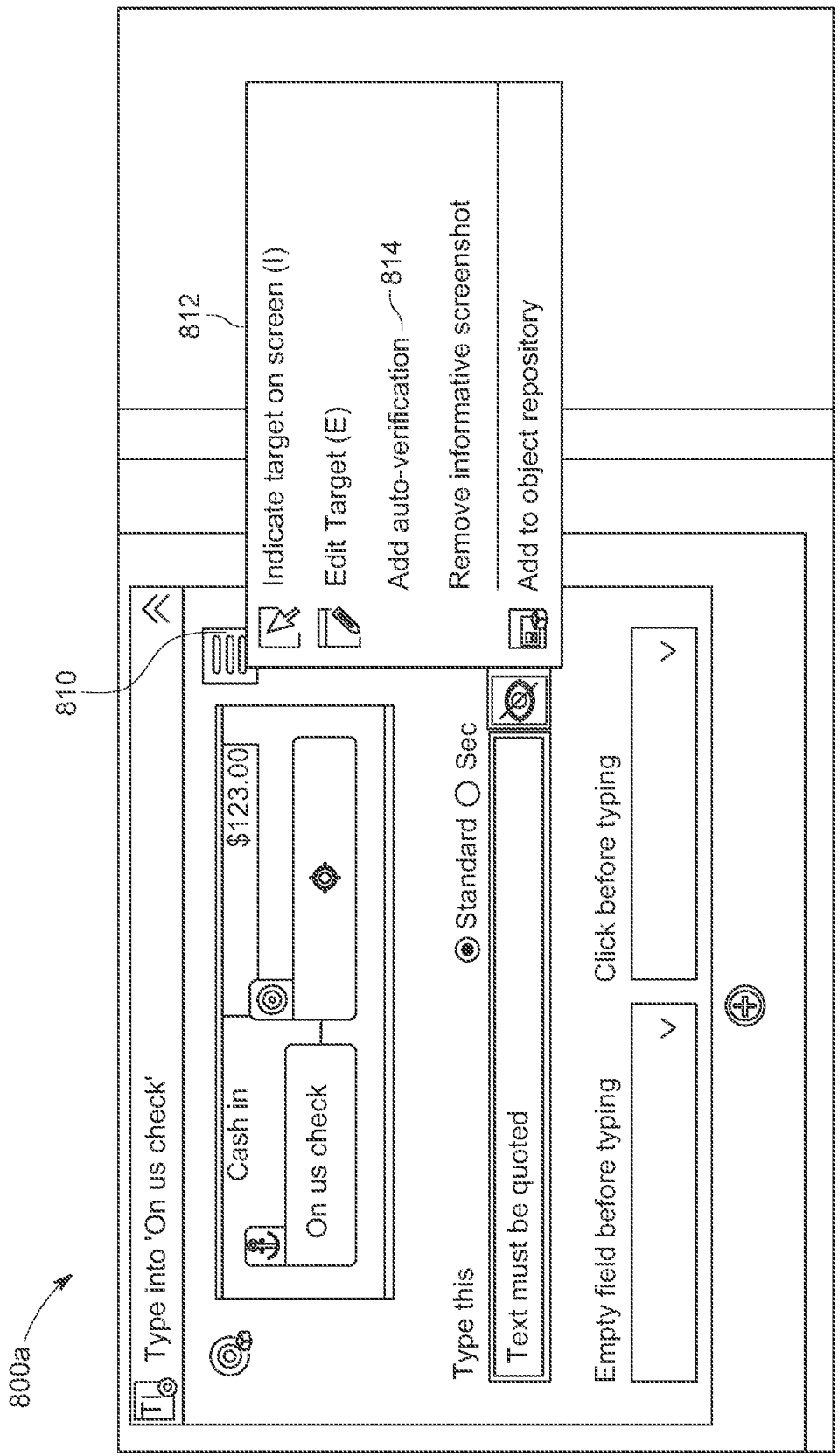
FIGS. 8A-8C show GUIs for verification of type into activities, according to an embodiment of the present invention.

FIG. 8A shows a GUI 800a for the type into activities, according to an embodiment of the present invention. GUI 800a includes a hamburger menu 810. In some embodiments, the user presses on hamburger menu 810 to display a list of options 812. The list of options 812 includes an add auto-verification 814 option. The user may select add auto-verification 814 option to enable verification of the type into activities. Further, the user may be provided with an option to specify a string that has to be verified.

Figure 8B:
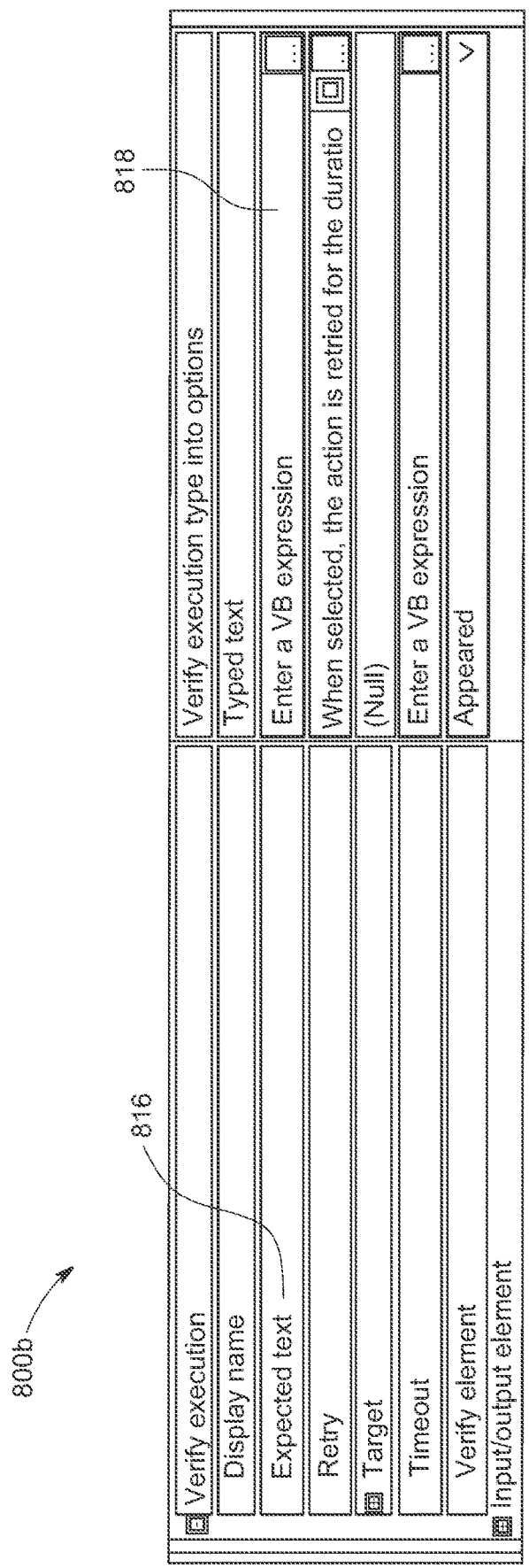

FIG. 8B shows a GUI 800b including an expected text 816 option for specifying the string that must be verified, according to an embodiment of the present invention. In some embodiments, the user presses on expected text 816 option and input the string in a box 818. For example, the user may input '123' in the box 818. The string inputted by the user in box 818 may be referred to as an input string. In response to the enablement of verification of the type into activities and receiving the string in box 818 from the user, processor 502 verifies successful execution of the type into activities, i.e., verifies when a target string is same as the input string. Further, test cases may be run at design-time for verification of the type into activities with respect to the input string, for example, '123'.

Figure 8C:
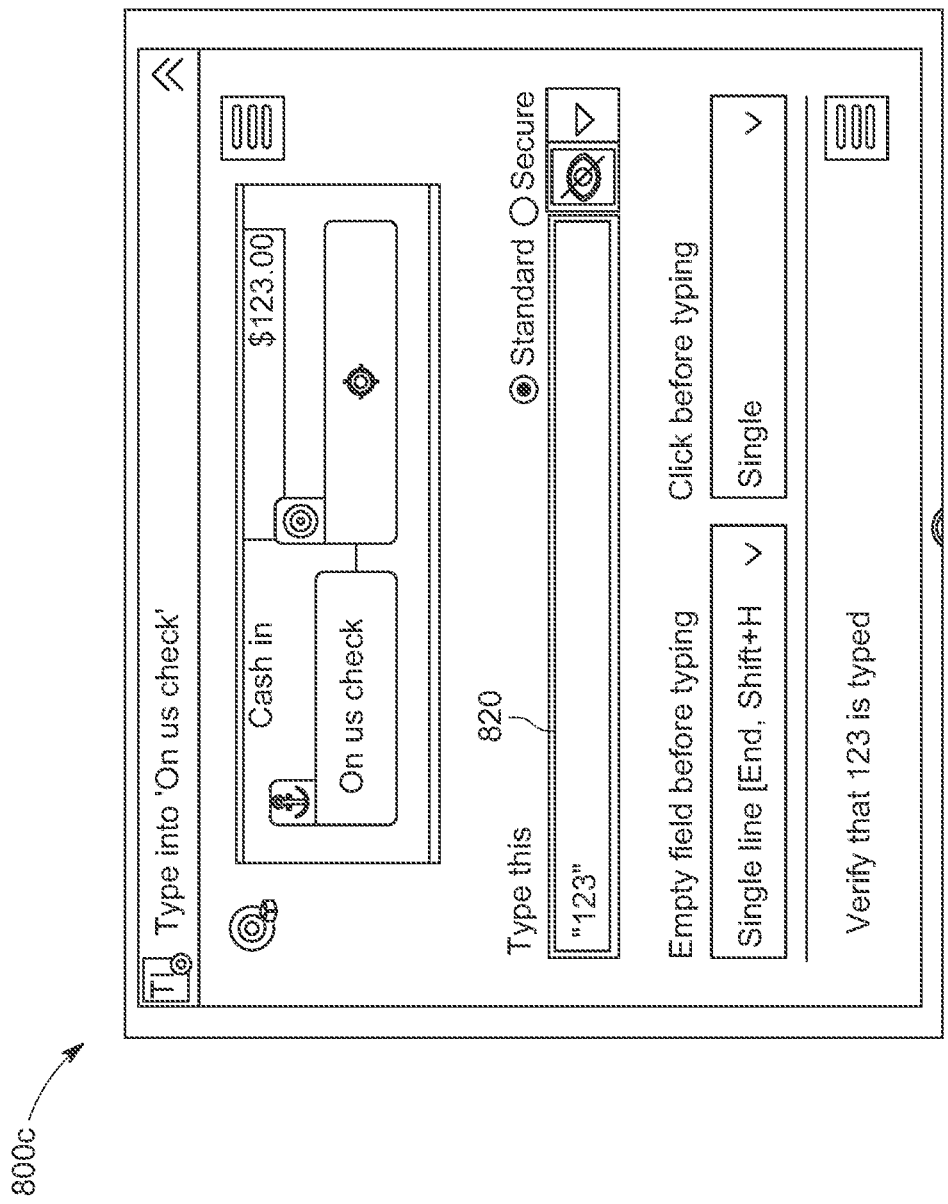

FIG. 8C shows a GUI 800c for executing the test cases for verification of the type into activities with respect to the input string, according to an embodiment of the present invention. In this embodiment, GUI 800c includes a box 820. The user may input a string, for example, '123', in box 820. The string inputted by the user in box 820 may be referred to as a target string. Processor 502 may verify if the target string is same as the input string. If there are any special keys in the input string and the target string, a warning is displayed. Alternatively, in some embodiments, non-printable special keys are allowed at the end of the input string and the target string, but not anywhere else. In an embodiment, at real time execution, special keys in the target string and the input string are stripped before these two strings are compared.

Figure 9:
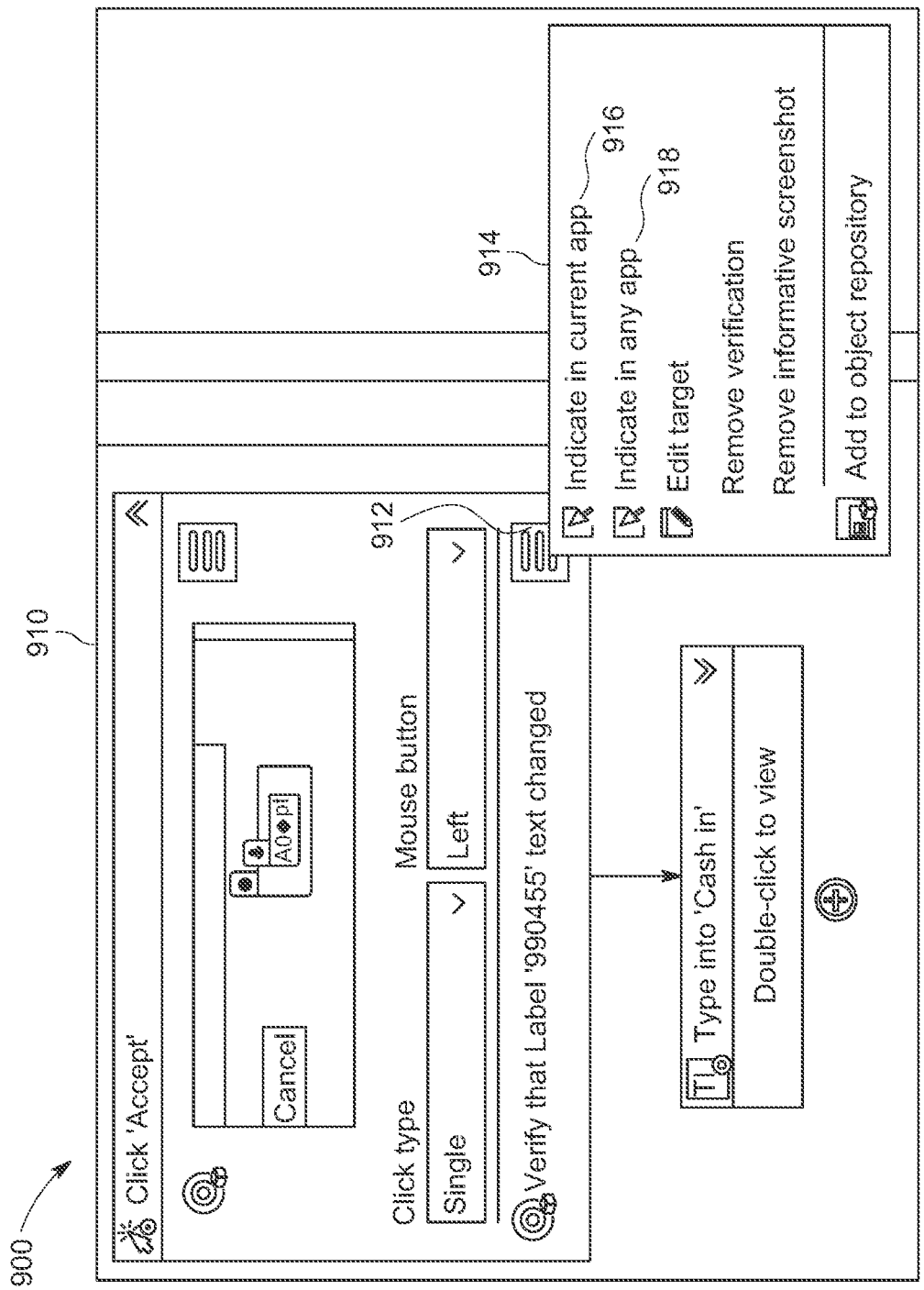
FIG. 9 shows a GUI illustrating operations associated with verification of activities including interaction between different applications, according to an alternate embodiment of the present invention.

FIG. 9 shows a GUI 900 illustrating an activity tab 910, according to an embodiment of the present invention. In some embodiments, activity tab 910 includes a hamburger menu 912. The user may press on hamburger menu 912 to display a list of options 914. List of options 914 includes options such as 'indicate in current app' 916 and 'indicate in any app' 918. The user may select 'indicate in current app' 916 option to indicate the verification element in the same application as the activity. The user may select 'indicate in any app' 918 option to indicate the verification element in an application different than the application that the activity is associated with.

Figure 10:
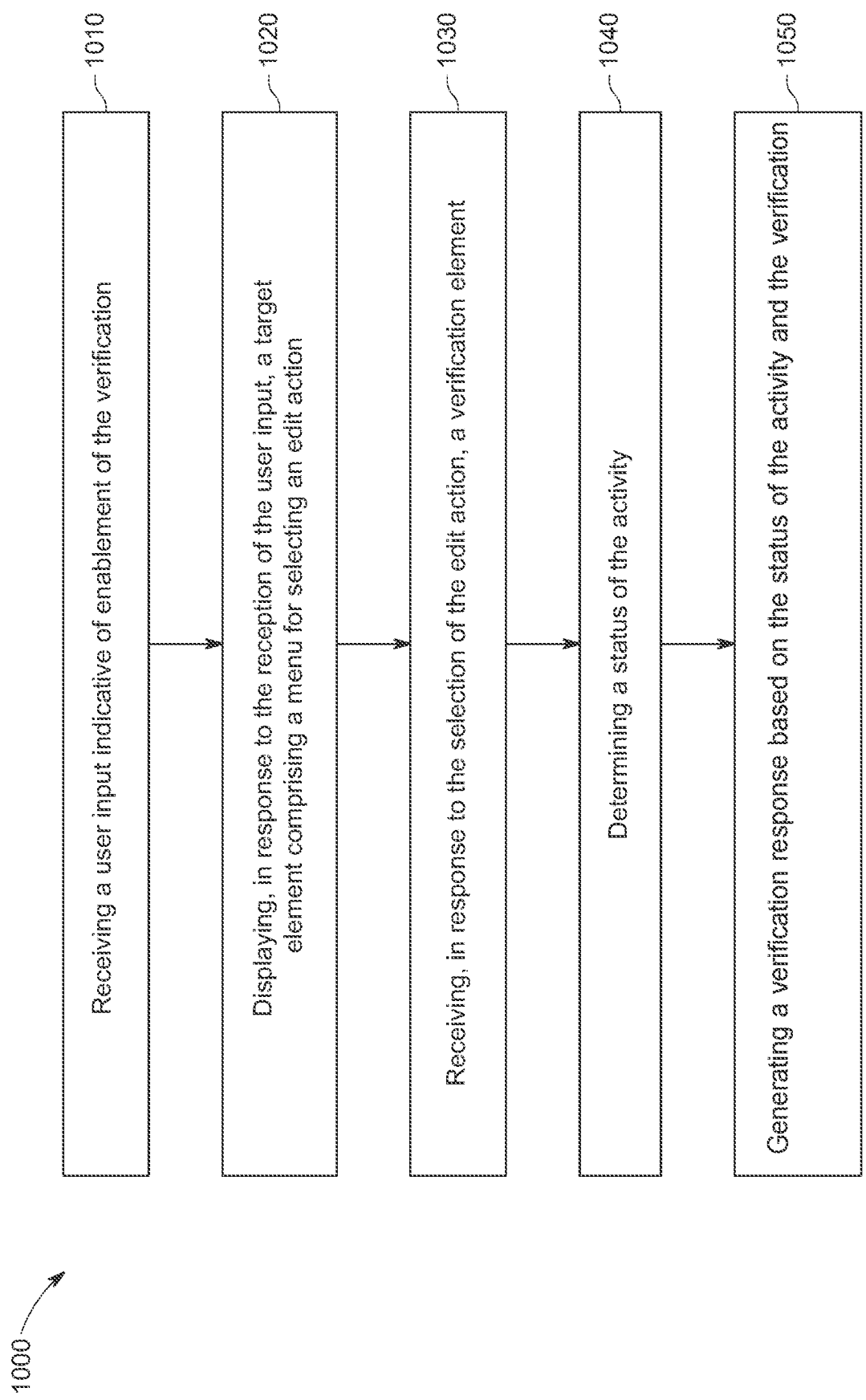
FIG. 10 is a flowchart illustrating a method for verification of execution of the activity, according to an embodiment of the present invention.

FIG. 10 is a flowchart illustrating a method 1000 for verification of successful execution of the activity, according to an embodiment of the present invention. At step 1010, method 1000 includes receiving a user input indicative of enablement of a feature corresponding to the verification of successful execution of the activity. For example, the user specifies an option to 'Add verification' 616 using list of elements 614, as illustrated in FIG. 6A. As soon as the user clicks on or selects the 'Add verification' 616 option, the feature of the user being able to verify whether their activity has executed successfully or not is enabled. The user in some embodiments is a developer or tester of an RPA application or workflow. Also, in some embodiments, this includes one or more activities such as a click type activity or a type into activity.

At step 1020, method 1000 includes displaying, in response to receiving the user input, a target element. The target element includes a menu, such as second hamburger menu 622, for selecting an edit action. The edit action corresponds to the option to edit the target element for specifying a verification element and its corresponding verification action. The verification element may be defined as a visual indicator. Depending on whether the visual indicator is displayed, the visual indicator would indicate whether the corresponding activity has executed successfully or not. The verification element may be in the form of a text string, a label, an image, a graphic, or any other form of visual indicator that may be used to provide a visual output to the user for verification of successful execution of the activity, and the verification action may be defined as an action, event or occurrence that causes a change in state of the verification element. For example verification action includes occurrences such as appearance or disappearance of a label, change of a text string, change of an image, display of a custom text and the like. Thus, appearance, disappearance, change, display and the like are verification actions that may be associated with a verification element like a label, an image or a text string. For illustration purposes, FIG. 6B illustrates target element 620, which includes menu 622. Menu 622 is used to select edit action displayed in the form of edit target 624b option in FIG. 6C.

At step 1030, the method includes receiving, in response to the selecting of the edit action, a verification element. In this example, as illustrated in FIG. 6C, in response to selecting an edit target 624b option, verification element 626 Label "Done" is received in target element 620 portion of activity tab 610. Additionally, verification action 628 "appears" is also specified for the verification element 626.

Further, at step 1040, method 1000 includes determining a status of the activity. The status of the activity is indicative of either a successful execution of the activity or a non-successful execution of the activity. The status of the activity is determined at runtime or at a testing stage. At step 1050, method 1000 includes generating a verification response based on the status of the activity and the verification element. For example, as illustrated by FIGS. 6A-6C, if the activity of click type as configured using activity tab 610 has executed successfully, then the label "Done" appears. This appearance of label "Done", which was specified by configuring verification element 626, and its verification action 628 is controlled by processor 520 to enable verification of the successful execution of the click type activity.

In an embodiment, method 1000 of FIG. 10 includes configuring a computer program associated with a hardware processor configured to execute a series of operations, wherein the series of operations are used to perform all or some of the steps described in conjunction with the method 1000. The hardware processor may, for example, be configured to execute the series of operations associated with method 1000 by performing hardware implemented logical functions, executing stored instructions, or executing algorithms for performing each of the operations. Alternatively, the apparatus includes a means for performing each of the operations described above. In this regard, according to an embodiment, examples means for executing the series of operations associated with method 1000 include processor 520, which is implemented in system 500 and/or a device or circuit for executing instructions or executing an algorithm for processing information as described above.

The computer program may be implemented in hardware, software, or a hybrid implementation. The computer program may be composed of modules that are in operative communication with one another, and which are designed to pass information or instructions to display. The computer program may be configured to operate on a general-purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system for verification of execution of an activity in a workflow or application using robotic process automation (RPA), comprising:
   memory configured to store one or more computer-executable instructions; and
   at least one processor configured to execute the one or more computer-executable instructions to:
      receive a user input indicative of enablement of a feature corresponding to the verification of successful execution of the activity;
      display, in response to the reception of the user input, a target element comprising a menu for selecting an edit action;
      receive, in response to the selection of the edit action, a verification element wherein the verification element is a visual indicator indicating whether a corresponding activity has executed, the corresponding activity being a click activity, a hover activity, and a type activity;
      determine a status of the activity, wherein the status of the activity is indicative of successful execution of the activity or non-successful execution of the activity; and
      generate a verification response based on the status of the activity and the verification element.

2. The system of claim 1, wherein the at least one processor is further configured to execute the one or more instructions to control, upon the determination of the successful execution of the activity, displaying the verification element to generate the verification response.

3. The system of claim 1, wherein the at least one processor is further configured to execute the one or more instructions to determine the status of the activity based on an activity timeout duration corresponding to the activity.

4. The system of claim 3, wherein the at least one processor is further configured to execute the one or more instructions to display, in response to the determination of the non-successful execution of the activity, an error notification after elapsing of the activity timeout duration to generate the notification response.

5. The system of claim 1, wherein the at least one processor is further configured to execute the one or more instructions to:
   receive a time duration value corresponding to a verification timeout duration; and
   generate the verification response, upon the determination of the successful execution of the activity, within the time duration value corresponding to the verification timeout duration.

6. The system of claim 5, wherein the at least one processor is further configured to execute the one or more instructions to:
   re-execute the activity, upon the determination of non-successful execution of the activity within the verification timeout duration, wherein the re-execution is performed for a number of the verification timeout durations until an activity timeout duration is reached, wherein a total duration of the number of the verification timeout durations is less than or equal to the activity timeout duration; and
   generate the verification response, upon the determination of non-successful execution of the activity, when the activity timeout duration is reached.

7. The system of claim 1, wherein the at least one processor is further configured to execute the one or more instructions to receive a user input indicative of enablement of an image change verification.

8. The system of claim 7, wherein, in response to the reception of the user input indicative of enablement of the image change verification, the at least one processor is further configured to execute the one or more instructions to:
   receive an image;
   obtain an image generated based on the execution of the activity;
   compare the received image and the obtained image; and
   determine, based on the comparison, a change in the received image.

9. The system of claim 1, wherein the at least one processor is further configured to execute the one or more instructions to receive a user input indicative of enablement of a text change verification.

10. The system of claim 9, wherein, in response to the reception of the user input indicative of enablement of the text change verification, the at least one processor is further configured to execute the one or more instructions to:
    receive text data;
    obtain text data generated based on the execution of the activity;
    compare the received text data and the obtained text data; and
    determine, based on the comparison, a change in the received text data.

11. A method for verification of execution of an activity in a workflow or application using robotic process automation (RPA), the method comprising:
    receiving a user input indicative of enablement of a feature corresponding to the verification of successful execution of the activity;
    displaying, in response to the reception of the user input, a target element comprising a menu for selecting an edit action;
    receiving, in response to the selection of the edit action, a verification element, wherein the verification element is a visual indicator indicating whether a corresponding activity has executed, the corresponding activity being a click activity, a hover activity, and a type activity;
    determining a status of the activity, wherein the status of the activity comprises either of successful execution of the activity or non-successful execution of the activity; and
    generating a verification response based on the status of the activity and the verification element.

12. The method of claim 11, wherein the method further comprises determining the status of the activity based on an activity timeout duration corresponding to the activity.

13. The method of claim 12, wherein the method further comprises displaying, in response to the determination of the non-successful execution of the activity, an error notification after elapsing of the activity timeout duration for generating the verification response.

14. The method of claim 11, wherein the method further comprises:
receiving a time duration value corresponding to a verification timeout duration; and
generating the verification response, upon the determination of the successful execution of the activity, within the time duration value corresponding to the verification timeout duration.

15. The method of claim 14, wherein the method further comprises:
re-executing the activity, upon the determination of non-successful execution of the activity within the verification timeout duration, wherein the re-execution is performed for a number of the verification timeout durations until an activity timeout duration is reached, wherein a total duration of the number of the verification timeout durations is less than or equal to the activity timeout duration; and
generating the verification response, upon the determination of non-successful execution of the activity when the activity timeout duration is reached.

16. The method of claim 11, wherein the method further comprises receiving a user input indicative of enablement of an image change verification.

17. The method of claim 16, wherein the method further comprises:
receiving an image, in response to the reception of the user input indicative of enablement of the image change verification;
obtaining an image generated based on the execution of the activity;
comparing the received image and the obtained image; and
determining, based on the comparison, a change in the received image.

18. The method of claim 11, wherein the method further comprises receiving a user input indicative of enablement of a text change verification.

19. The method of claim 18, wherein the method further comprises:
receiving text data, in response to the reception of the user input indicative of enablement of the text change verification;
obtaining text data generated based on the execution of the activity;
comparing the received text data and the obtained text data; and
determining, based on the comparison, a change in the received text data.

20. A computer program stored on a non-transitory computer readable medium, the computer program, when executed by one or more processors, is configured to cause the one or more processors to execute operations for verification of execution of an activity in a workflow or application using robotic process automation (RPA), the operations comprising:
receiving a user input indicative of enablement of a feature corresponding to the verification of successful execution of the activity;
displaying, in response to the reception of the user input, a target element comprising a menu for selecting an edit action;
receiving, in response to the selection of the edit action, a verification element, wherein the verification element is a visual indicator indicating whether a corresponding activity has executed, the corresponding activity being a click activity, a hover activity, and a type activity;
determining a status of the activity, wherein the status of the activity comprises either of successful execution of the activity or non-successful execution of the activity; and
generating a verification response based on the status of the activity and the verification element.

* * * * *